(12) United States Patent
Ericksen et al.

(10) Patent No.: US 7,445,247 B2
(45) Date of Patent: Nov. 4, 2008

(54) IRRIGATION COUPLING APPARATUS

(75) Inventors: Kent C. Ericksen, North Salt Lake, UT (US); Alan John Smith, Bountiful, UT (US); Michael Ray Ericksen, Farmington, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 328 days.

(21) Appl. No.: 11/124,217

(22) Filed: May 6, 2005

(65) Prior Publication Data

US 2005/0206160 A1 Sep. 22, 2005

Related U.S. Application Data

(63) Continuation of application No. 10/678,013, filed on Oct. 2, 2003, now Pat. No. 7,021,672.

(60) Provisional application No. 60/474,040, filed on May 29, 2003.

(51) Int. Cl.
*F16L 35/00* (2006.01)
*F16L 55/00* (2006.01)

(52) U.S. Cl. .......................... 285/39; 285/93; 285/104; 285/308; 285/313; 285/323

(58) Field of Classification Search ................. 285/308, 285/313, 316, 319, 93, 148.14, 148.15, 148.21, 285/147.1, 147.2, 147.3, 39, 104, 105, 322, 285/323, 340

See application file for complete search history.

(56) References Cited

U.S. PATENT DOCUMENTS

| 991,501 | A | | 5/1911 | Graves |
|---|---|---|---|---|
| 2,514,717 | A | | 7/1950 | Power |
| 3,051,514 | A | | 8/1962 | Consolloy |
| 3,976,314 | A | | 8/1976 | Graham |
| 4,005,883 | A | | 2/1977 | Guest |
| 4,804,213 | A | * | 2/1989 | Guest .......................... 285/308 |
| 5,171,045 | A | * | 12/1992 | Pasbrig ........................ 285/308 |
| 5,219,188 | A | | 6/1993 | Abe et al. |
| 5,230,539 | A | | 7/1993 | Olson |
| 5,328,215 | A | * | 7/1994 | Grenier ....................... 285/318 |
| 5,378,025 | A | | 1/1995 | Szabo |
| 5,401,064 | A | | 3/1995 | Guest |
| 5,437,483 | A | * | 8/1995 | Umezawa .................... 285/308 |
| 5,496,073 | A | * | 3/1996 | Grenier ........................ 285/39 |
| 5,692,784 | A | * | 12/1997 | Hama et al. .................. 285/308 |
| 5,695,224 | A | * | 12/1997 | Grenier ....................... 285/104 |

(Continued)

*Primary Examiner*—James M Hewitt
*Assistant Examiner*—Jay R Ripley
(74) *Attorney, Agent, or Firm*—Madson & Austin

(57) ABSTRACT

In a fluid system such as irrigation system, fluid conduit attachment is facilitated through the use of a coupling. The coupling may have a body with a first end attached to a component such as an irrigation component, and a second end designed to receive an end of a conduit. The first end may be integrally formed with the component or separately attached thereto. The second end has a bore into which the end of the conduit is inserted. A gripping mechanism is seated in the bore to grip the end of the conduit. A release mechanism slides to release the conduit. The coupling may have a bend and/or branches extending to extra ends. A second coupling may be added to form a rotatable swing joint. An indicator such as a blue color may be used to indicate compatibility of the coupling with the conduit.

33 Claims, 9 Drawing Sheets

U.S. PATENT DOCUMENTS 5,722,696 A * 3/1998 Taneya .................. 285/39
5,727,821 A * 3/1998 Miller .................. 285/318
6,550,815 B2   4/2003 Zitköwic, Jr. et al.
2006/0108802 A1 * 5/2006 Baumgartner .............. 285/322

* cited by examiner

IRRIGATION COUPLING APPARATUS

CROSS-REFERENCED RELATED APPLICATIONS

This application claims the benefit of U.S. Provisional Application No. 60/474,040, filed May 29, 2003 and entitled IRRIGATION COUPLING APPARATUS AND METHOD, which is incorporated herein by reference.

This application is a continuation of prior application Ser. No. 10/678,013, now U.S. Pat. No. 7,021,672 filed Oct. 2, 2003 and entitled IRRIGATION COUPLING APPARATUS AND METHOD.

BACKGROUND OF THE INVENTION

The present invention relates to couplings for fluid systems. More specifically, the present invention relates to couplings that may be used to easily retain or release flexible plastic tubing such as that typically used in irrigation systems.

Many types of systems have components between which fluid is conveyed through conduits. Such fluid systems include irrigation systems, household plumbing, air conditioning systems, heater humidifiers, misting systems, and garden hoses. Typically, the conduits of the fluid system must be coupled to components in such a manner that a fluid-tight seal is maintained. Thus, the process of connecting the conduits to their respective components can be somewhat time-consuming.

For example, in a standard residential irrigation system, lengths of polyvinylchloride (PVC) pipe are typically buried to act as conduits. The lengths of pipe must be attached to components of the system such as manifolds, electric valves, stop and waste valves, backflow prevention devices, sprinkler heads, and drip irrigation tubes. In some cases, other conduits such as conduit (i.e., "flexi-pipe") may be used to couple a PVC pipe to an irrigation component.

More precisely, the lengths of PVC pipe or conduit must often be attached to each other or to irrigation components via application of primer and plastic cement. Such a process is somewhat time consuming and messy, and provides a relatively unreliable connection. To the extent that threaded or barbed fittings can be used, connection may be performed more rapidly than with primer and glue, but the integrity of the connection is still uncertain.

Furthermore, a glued connection cannot be released. Hence, if such a junction is faulty, the PVC pipe or flexi-pipe on either side of the junction must be severed, and one or more new junctions must be glued in place. Threaded fittings require that one of the parts be rotatable during attachment. Barbed fittings may be difficult for some people to install due to the force required to insert the barbs far enough to provide retention. Thus, connecting the components and lengths of PVC pipe and/or flexi-pipe together may be somewhat cumbersome and time-consuming.

Various types of couplings are available to attach irrigation components, PVC pipe, and/or flexible tubing together. However, known couplings have a number of inherent disadvantages. Often, such couplings require primer and glue, threaded attachment, or barbed attachment, and therefore add significantly to the required installation time. Some such couplings require tooling for attachment or detachment. Some couplings are not readily detachable, while others may not function properly under certain conditions, such as when buried underground.

Yet further, many known couplings do not indicate the proper size of conduit to make a fluid-tight connection with the coupling. Different manufacturers make irrigation flexi-pipe in sizes that are different enough to be incompatible, and yet similar enough to appear the same. Hence, many consumers may accidentally purchase or attempt to connect couplings and flexi-pipe that are incompatible with each other.

Still further, many known couplings designed to connect to flexi-pipe are rigid, and therefore require the flexi-pipe to be connected to the coupling at only one angle. Such an arrangement may tend to place undue stress on the flexi-pipe. The flexi-pipe may thus become weakened, disconnected, or pinched as a result.

BRIEF SUMMARY OF THE INVENTION

The apparatus of the present invention has been developed in response to the present state of the art, and in particular, in response to the problems and needs in the art that have not yet been fully solved by currently available fluid systems and fluid couplings. Thus, it is an overall objective of the present invention to provide fluid systems that include couplings that remedy the deficiencies of the prior art.

To achieve the foregoing objective, and in accordance with the invention as embodied and broadly described herein in the preferred embodiment, a fluid system is provided. The fluid system may be an irrigation system, a heater humidification system, an air conditioning system, a misting system, an evaporative cooler, or the like. In one embodiment, the fluid system is an irrigation system designed to distribute water over soil. The irrigation system may include a plurality of components designed for soil irrigation, which may be termed "irrigation components." Sprinkler heads, drip irrigation conduits, electrically operated valves, stop and waste valves, backflow preventers, conduits, garden hoses, and the like are irrigation components. Conduits convey irrigation water between the components. The conduits and components may be coupled together via couplings.

One exemplary subset of the irrigation system may have a conduit coupled to an irrigation component. The conduit may be a length of conduit, and may be formed of an inexpensive material such as plastic. The coupling is designed to connect an end of the conduit to a threaded end, or other fitting, of the irrigation component.

The coupling includes a body and a release mechanism that is slidable with respect to the body to cause the body to release the conduit. The body has a first end designed to be attached to the irrigation component and a second end that receives the end of the conduit. The first end may comprise a threaded end or the like. The second end may comprise a shoulder and two retention features that extend outward from the shoulder to interlock with the release mechanism. The body has a bend that changes the flow orientation of fluid flowing between the first and second ends.

The release mechanism may take the form of a release ring with an exterior sleeve that encircles the second end. A pair of retention slots are formed in the exterior sleeve in alignment with the retention features such that the retention features protrude into the retention slots. Each of the retention features may have a ramp and a plateau situated such that the ramp tends to widen the exterior sleeve during assembly to enable the exterior sleeve to slide over the retention features until the retention features are situated in the retention slots. The plateaus abut an end of each retention slot to limit the range of motion of the exterior sleeve with respect to the second end.

The release ring has a pair of release grips that extend outward from the exterior sleeve. The release grips have contact surfaces oriented such that a user can easily press against them with fingers and/or a thumb to move the release ring.

The release ring also has an interior sleeve coupled to the exterior sleeve by an annular wall disposed outside the second end. The interior and exterior sleeves cooperate to keep the release ring substantially coaxial with the first end.

The exterior sleeve is sized to provide a very small clearance with the shoulder. Hence, a narrow annular gap exists between the exterior sleeve and the shoulder. The clearance is small enough that dirt is generally unable to enter the annular gap, and is thus unable to impede the motion of the release ring. Hence, the coupling can be buried and subsequently disinterred without reducing the user's ability to disconnect the conduit from the coupling via the release ring.

The body has an indicator that indicates what type of conduit can properly be retained by the coupling. The indicator may be a color, such as blue, that matches a corresponding color present on the conduit. The body and the conduit may, for example, be molded from blue plastic. The release ring may alternatively have the indicator.

The body has a bore that extends between the first end and the second end to convey water through the coupling. The end of the conduit is inserted into the bore. The bore has a retention portion that the end of the conduit may abut when the end has been sufficiently inserted into the bore. A gripping mechanism, in the form of a spring washer, is seated against a lipped step in the bore. The spring washer has fingers that extend radially inward and are deflected when the end of the conduit is inserted into the bore. In response to force urging withdrawal of the end of the conduit from the bore, the fingers seat in the end of the conduit to provide gripping action, thereby keeping the end of the conduit from being withdrawn.

A seal ring is seated against a flat step of the bore, inward of the spring washer. The seal ring is formed of a resilient material such as rubber, such that the seal ring is able to form a substantially watertight seal against the outside diameter of the end of the conduit. The seal ring may have a countersink that facilitates insertion of the end of the conduit through the seal ring.

The coupling is easily installed by inserting the end of the conduit into the bore until the end of the conduit abuts the retention portion of the bore. The seal ring abuts the outside diameter of the end of the conduit to provide a seal, and the spring washer seats against the end of the coupling to keep the end within the bore. The irrigation component may be threadably engaged or otherwise attached to the first end of the coupling.

The coupling is also easily disconnected from the end of the conduit. The user may simply apply pressure against the release ring to slide the release ring along the axis of the bore. The interior sleeve presses against the fingers of the spring washer to push them away from the end of the conduit, thereby permitting withdrawal of the end of the conduit from the bore of the body.

According to one alternative embodiment of the invention, a fluid system such as an irrigation system again includes an irrigation component, a coupling, and a conduit. The coupling has a body with a first end and a second end. However, the first end does not have an attachment fitting, but is instead integrally formed with the irrigation component. The body extends straight from the first end to the second end. The second end comprises a shoulder that interlocks with a release ring in the manner described above, in connection with the previous embodiment. The end of the conduit is again retained within a bore of the body by a spring washer.

The conduit may be connected to or disconnected from the coupling in a manner similar to that described above. The irrigation component need not be connected to the coupling because it is integrally formed with the first end of the body.

The body or the release ring may have an indicator, in the form of a symbol, which matches a similar indicator of the conduit to indicate that the conduit is compatible with the coupling.

According to another alternative embodiment of the invention, a fluid system such as an irrigation system may have an irrigation component coupled to a conduit via a swing joint designed to permit disposition of the end of the conduit at multiple angles with respect to the irrigation component. The swing joint includes a coupling as described in connection with the first embodiment. The coupling has a bend with an angle of ninety degrees.

Additionally, the swing joint includes a swing coupling having a body and a release mechanism. The body has a first end and a second end. The second end may comprise a shoulder and a bore that receives the end of the conduit. The release mechanism is a release ring like that described previously, so that the end of the conduit is received by the swing coupling in a manner similar to that of the first embodiment.

The first end of the body of the swing coupling comprises a tube having a size similar to that of the conduit. Hence, the first end of the swing coupling may be inserted into the bore of the coupling and retained via the retainer ring of the coupling. The swing coupling also has a bend with a ninety degree angle. Since the tube of the first end of the swing coupling can be retained in the second end of the coupling in a plurality of orientations, the bends of the coupling and the swing coupling cooperate to permit the end of the coupling to be disposed parallel to the first end of the coupling, perpendicular to the first end of the coupling, or at any angle therebetween. Thus, connection of the end of the conduit to the irrigation component can be performed at a relative angle that does not place undue stress on the conduit.

According to another alternative embodiment of the invention, a fluid system such as an irrigation system has a pair of conduits, an irrigation component, and a coupling designed to connect both of the conduits to the irrigation component. The coupling includes a body and a pair of release mechanisms, each of which comprises a release ring like those described previously. The body has a first end connected to the irrigation component and a second end that interlocks with one of the release rings to releasably receive one of the conduits. The first and second ends are separated by a bend with a ninety-degree angle.

The body also has a branch extending from the bend to a third end of the body. The branch extends at an angle such that the coupling is generally T-shaped. The third end comprises interlocks with the other release ring to releasably receive the other conduit. Hence, the conduits can be parts of a water line that conveys water to or from multiple irrigation components.

According to yet another alternative embodiment of the invention, a fluid system such as an irrigation system may have four conduits coupled together via a coupling. The coupling has a body comprising a first end, a second end, a third end, and a fourth end. The first and second ends are separated by a bend with a ninety degree angle. The third and fourth ends are disposed on first and second branches, respectively, which extend from the bend such that the body generally has an X-shape. Each end interlocks with a retainer ring designed to permit the end to releasably receive an end of one of the conduits. Thus, the coupling provides a four-way junction for water flow.

Through the use of the apparatus and method of the invention, connections within fluid systems may be more easily and reliably made. Furthermore, the overall expense and installation time of such fluid systems may be reduced. These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

A particular description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 9, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
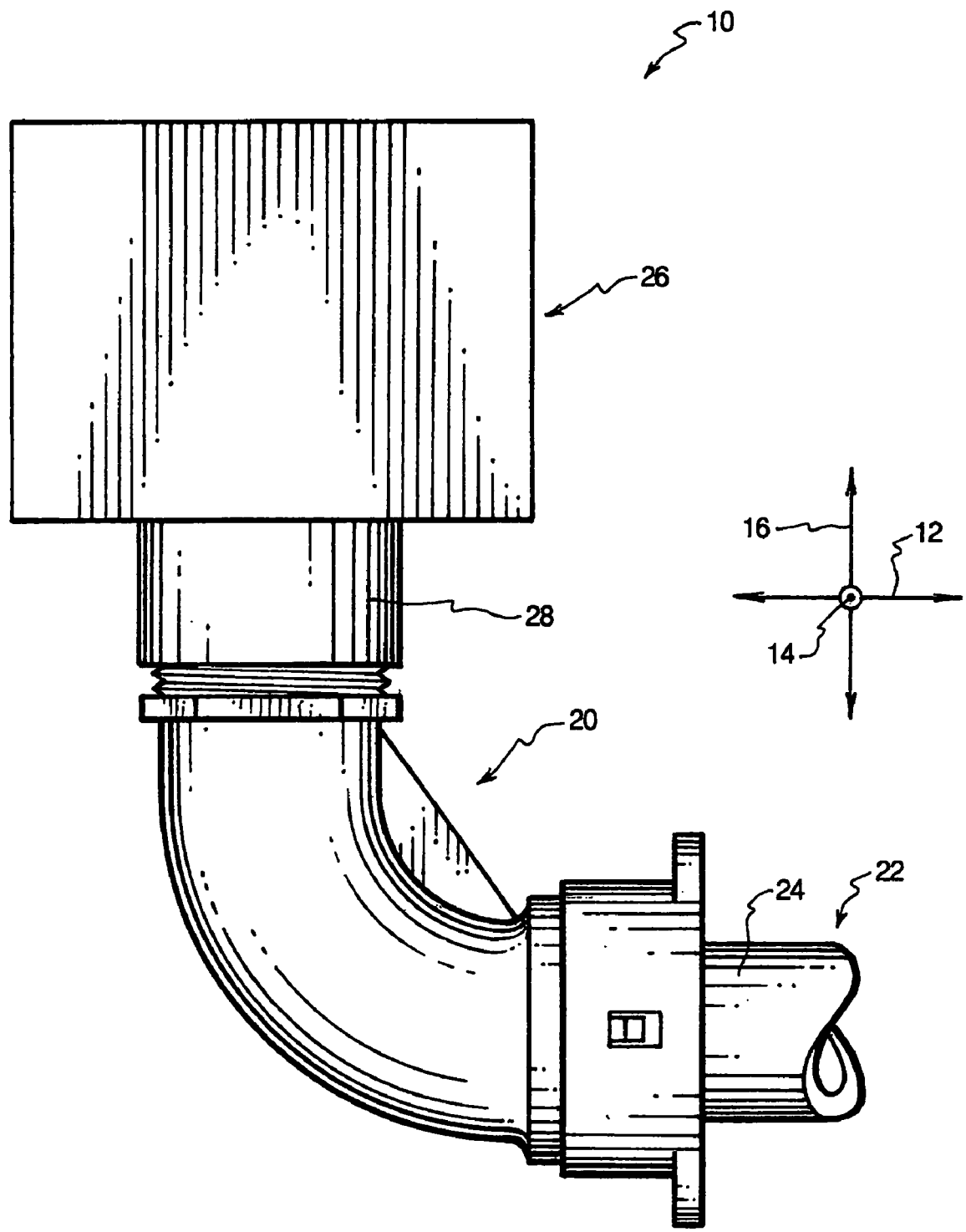
FIG. 1 is a side elevation view of a portion of a generalized fluid system having a component, a conduit, and a coupling according to one embodiment of the invention.

Referring to FIG. 1, a side elevation view illustrates a portion of a generalized fluid system 10 according to one embodiment of the invention. A "fluid system" refers to any type of system that contains and/or moves fluid (including liquids, gases, and liquid/gas mixtures) through any type of conduit. The fluid system 10 may be of a wide variety of types, including but not limited to irrigation systems, heater humidification systems, air conditioning systems, evaporative cooling systems, misting systems for outdoor comfort, and the like. For convenience in this discussion, the fluid system 10 is assumed to be an irrigation system for distributing water onto soil.

The fluid system 10 has a longitudinal direction 12, a lateral direction 14, and a transverse direction 16. As shown, the fluid system 10 includes a coupling 20, which is designed to be attached to a length of conduit 22. The conduit 22 may include any of a variety of conduit types, including metal tubing, PVC pipe, or plastic "flexi-pipe" of a type commonly used in residential sprinkler systems. The conduit 22 has an end 24 designed to be captured by the coupling 20.

The coupling 20 provides fluid communication between the conduit 22 and a component 26, which may be any of a variety of fluid implements. "Fluid communication" refers to the existence of a generally enclosed fluid flow pathway between two articles. In the fluid system 10 of FIG. 1, the component 26 is designed for irrigation, and may thus include implements such as sprinkler heads, perforated water distribution tubes, electrically operated valves, stop and waste valves, backflow preventers, sprinkler risers, spray nozzles, garden hoses, and conduits. Since the invention includes a wide variety of fluid systems aside from irrigation systems, the term "component" contemplates the use of a wide variety of other types of fluid implements.

A "spray nozzle" may be any of a variety of nozzles such as hand sprayers for irrigation or household cleaning, misting nozzles designed to provide a comfortable mist in warm weather, internal furnace humidifier nozzles, and the like. A "perforated water distribution tube" may include drip irrigation lines, water distribution lines for evaporative coolers, and the like. A "valve" includes many different types of valves, including check valves, electrically operated valves, manually operated valves, and the like. A stop and waste valve for irrigation systems is included within the term "valve."

In one embodiment, the component 26 is a sprinkler designed to be seated in the ground in a vertical orientation and fed by fluid flowing generally horizontally through the conduit 22. Thus, the coupling 20 is shaped to form a ninety-degree angle. The coupling 20 may thus be termed an "elbow fitting." In other embodiments, similar couplings could be made straight, U-shaped, or with any other desirable angle. The component 26 has a fitting such as a threaded end 28 designed to engage the coupling 20. A "fitting" need not be a separate fastening device, but may simply be an attachment interface integrally formed with a component.

Figure 2:
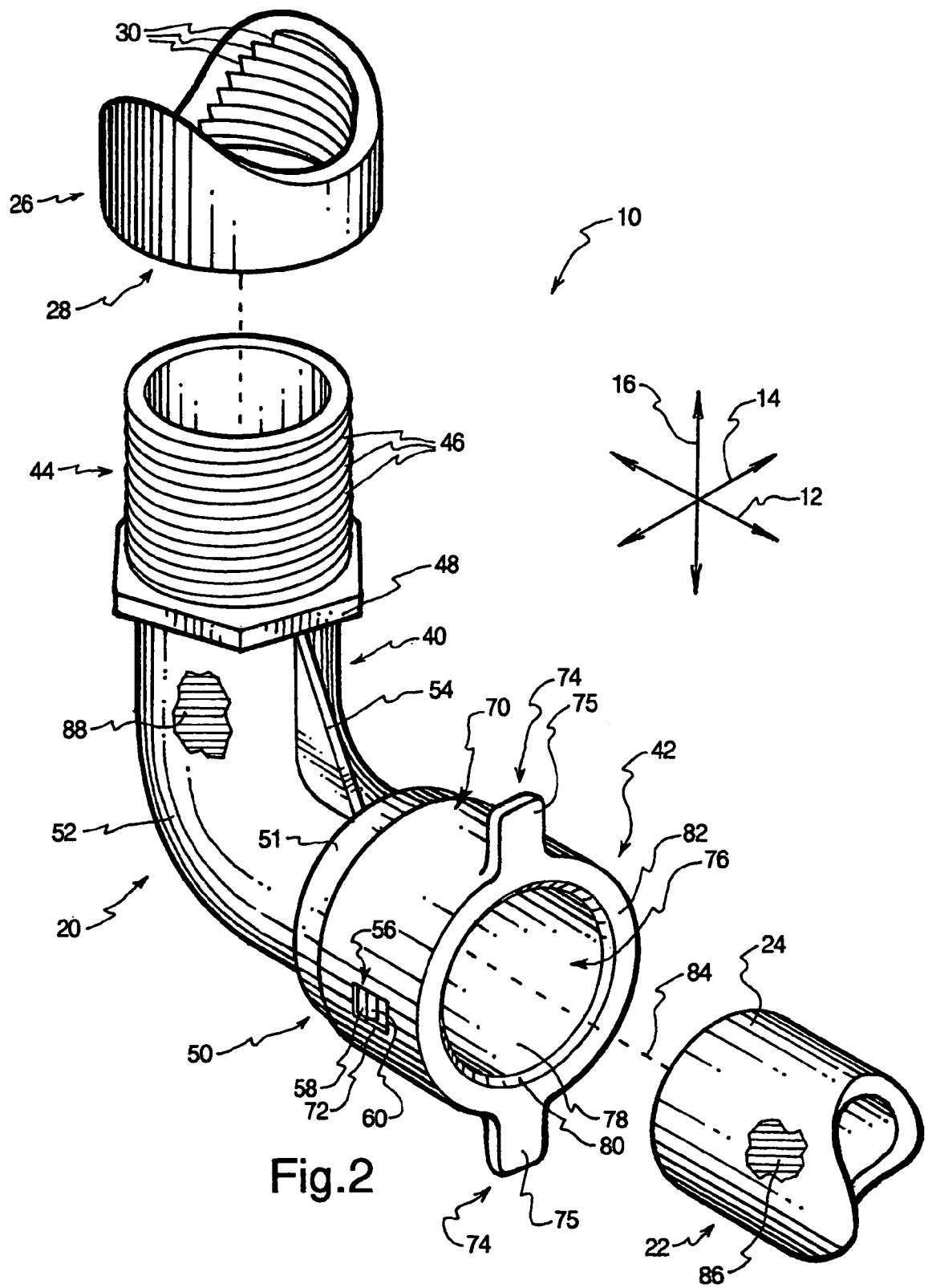
FIG. 2 is a perspective, exploded view of the fluid system of FIG. 1, in which the coupling is in the engaged configuration to retain an end of a length of the conduit.

Referring to FIG. 2, an exploded, perspective view illustrates a portion of the fluid system 10 of FIG. 1 in greater detail. As shown, the threaded end 28 of the component 26 has been cut away to reveal that the threaded end 28 has threads disposed on an inside diameter thereof. The threads 30 thus act as female threads to attach the coupling 20 to the component 26. Of course, in an alternative embodiment, the component 26 could have male threads and the coupling 20 could have female threads.

In the embodiment shown, the coupling 20 has a body 40 and a release mechanism 42 that is slidable with respect to the body 40 along the longitudinal direction 12. "Slidable" refers to the ability for two objects to move relative to and in contact with each other. "Sliding" encompasses linear motion, rotary motion, and combinations thereof. In the embodiment shown, the release mechanism 42 is generally ring-shaped, and may thus be termed a release ring 42. The body 40 has a first end 44 designed to be connected to the threaded end 28 of the component 26. The first end 44 thus has threads 46 sized to mate with the threads 30 of the threaded end 28. Additionally, the first end 44 may have a hexagonal lip 48 that facilitates rotational coupling and tightening of the first end 44 with the threaded end 28 of the component 26.

In alternative embodiments, a wide variety of fitting types may be used in place of the threads 30 of the first end 44. For example, a female threaded fitting, quick-connect coupling, swage lock, snap-in fitting, or the like may be used to connect to a wide variety of corresponding fittings.

The body 40 also has a second end 50 in which a shoulder 51 is formed. The shoulder 51 is generally tubular in shape. The second end 50 and the first end 44 are separated by a bend 52 that provides the ninety-degree angle. The bend 52 is structurally supported by a gusset 54 that extends generally from the first end 44 to the second end 50.

The second end 50 has a pair of retention features 56 displaced from each other in the lateral direction 14, and thus positioned on opposite sides of the shoulder 51. The retention features 56 are designed to slidably retain the release ring 42. Each retention feature 56 has a plateau 58 that limits relative motion between the release ring 42 and the body 40, and a ramp 60 adjoining the plateau 58 to facilitate assembly of the release ring 42 and the body 40.

The release ring 42 has an exterior sleeve 70. The exterior sleeve 70 is sized just larger than the shoulder 51 so that the exterior sleeve 70 is able to act as a dirt shield, thereby preventing entry of dirt or other particles into the space between the release ring 42 and the second end 50. The exterior sleeve 70 extends a sufficient distance in the longitudinal direction 12 to provide a relatively snug fit between the release ring 42 and the second end 50 and enhance protection from contamination. The operation of the exterior sleeve 70 as a dirt shield will be discussed in greater detail subsequently. The dimensions of the exterior sleeve 70 also facilitate longitudinal motion of the release ring 42 with respect to the body 40 by maintaining the concentricity of the release ring 42 with the second end 50.

A pair of retention slots 72 is formed in the exterior sleeve 70 and positioned such that the retention features 56 extend into the retention slots 72. Each of the retention slots 72 is generally rectangular in shape, and is slightly longer in the longitudinal direction 12 than the combined longitudinal dimensions of the plateau 58 and the ramp 60 of the corresponding retention feature 56. Thus, the exterior sleeve 70 is able to move a limited distance in the longitudinal direction 12 with respect to the second end 50 of the body 40.

Disposition of the retention slots 72 and the retention features 56 on the outside of the coupling 20 is advantageous because they are relatively easy to manufacture and manipulate, and they do not interfere with insertion of the conduit 22 into the coupling 20. The retention slots 72 and the retention features 56 also operate in such a manner that no rotation of the release ring 42 is required to move between engaged and disengaged configurations. In alternative embodiments, a release mechanism may be rotatable or translatable and rotatable.

When the release ring 42 is extended from the second end 50, to the furthest extent permitted by the interlocking of the retention features 56 with the retention slots 72, the coupling 20 is in the engaged configuration, in which the end 24 of the conduit 22 may be retained within the coupling 20. When the release ring 42 is pressed toward the second end 50, the coupling 20 is in the disengaged configuration to permit removal of the end 24 from the coupling 20.

As shown, the release ring 42 also has a pair of release grips 74 extending in the transverse direction 16. The release grips 74 may be easily gripped and/or pressed in the longitudinal direction 12 to press the release ring 42 toward the second end 50 of the body 40. The release grips 74 facilitate movement of the release ring 42 in the longitudinal direction 12 by providing contact surfaces 75 that are generally perpendicular to the longitudinal direction 12. The contact surfaces 75 are easily and comfortably pressed by a user's fingers and/or thumb to exert the necessary pressure on the release ring 42. The release grips 74 may also facilitate one-handed actuation of the coupling 20 between the engaged and disengaged configurations.

The release ring 42 also has an interior sleeve 76 that defines a bore 78 into which the end 24 of the conduit 22 is inserted. A countersink 80 of the release ring 42 is disposed outside of and adjacent to the bore 78 to facilitate insertion of the end 24 into the bore 78. The release ring 42 has an annular wall 82 that extends from the interior sleeve 76 to the exterior sleeve 70. The shoulder 51 has an axis 84 extending along the longitudinal direction 12. The axis 84 is shared by the exterior sleeve 70, the interior sleeve 76, the annular wall 82, and a bore (not shown) of the body within the shoulder 51.

In alternative embodiments, the release ring 42 may simply be omitted. The corresponding coupling (not shown) may then be designed to permanently (i.e., non-releasably) retain the end of a conduit. Alternatively, such a coupling may release the end of the conduit in response to pressure from an external implement, such as a collar (not shown) slidable around the conduit. Such a collar may have two halves that are hinged or otherwise separable to permit removal of the collar from the conduit so that a single collar can be used to trigger release of a plurality of couplings.

Returning to the embodiment of FIG. 2, the conduit 22 has an indicator 86 disposed on its outside diameter. The indicator 86 indicates the size of the conduit 22, and may more particularly relate to the magnitude of the outside diameter of the conduit 22. Different manufacturers make flexible irrigation tubing in similar, and yet significantly different sizes. Consequently, a user may find it difficult to determine which irrigation implements are attachable to a given length of flexipipe. The indicator 86 is easily visible to the user to indicate the size of the conduit 22.

In this application, "indicating the size" does not necessarily require conveying the numerical size to a user; rather, only the category within which the size falls need be conveyed. Thus, the indicator 86 need not include letters or numbers, but may simply be a color. In the embodiment of FIG. 2, the indicator 86 is the color blue. The color blue may be useful because there is very little structure underground, whether natural or man-made, that is blue. The entire conduit 22 may have a blue color, which may be provided by injection molding the conduit 22 from blue plastic. Consequently, the indicator 86 may be easily visible, even when the conduit 22 is partially buried. Apart from use of the indicator 86 to indicate the size of the conduit 22, such a feature makes the conduit 22 easier to see and distinguish from other subterranean objects. Other colors besides blue may, of course, alternatively be used for the indicator 86.

The coupling 20, or more specifically, the body 40, may also have an indicator 88. The indicator 88 indicates the size of conduit receivable by the coupling 20 to provide a fluid-tight connection. The indicator 86 may thus correspond to the indicator 88 to show that the coupling 20 is compatible with the conduit 22. The indicator 86 may even be substantially the same as the indicator 88. Indicators that are "substantially the same" are indicators that would be visually recognized as pertaining to compatible or corresponding parts. If desired, the body 40 (and/or the remainder of the coupling 20) may be formed of blue plastic, and the conduit 22 may similarly be formed of plastic of the same blue color to indicate that they are connectable to each other. In alternative embodiments, the indicator 88 may be disposed on the release ring 42 in addition to or instead of on the body 40.

Figure 3:
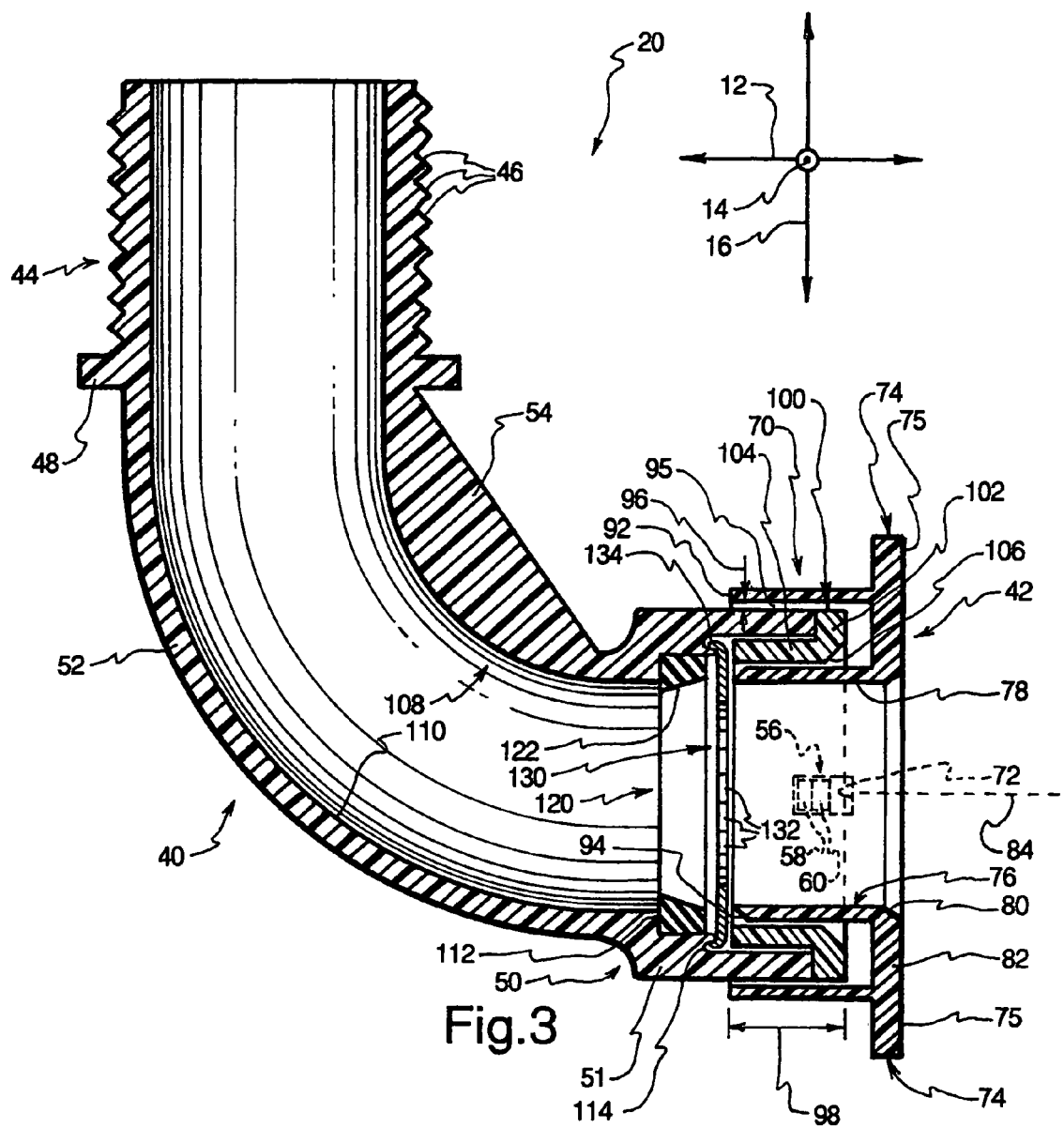
FIG. 3 is a side elevation, section view of the coupling of FIG. 1, still in the engaged configuration.

Referring to FIG. 3, a side elevation, section view illustrates the coupling 20, in isolation from the remainder of the fluid system 10. The coupling 20 is shown in the engaged configuration, as in FIGS. 1 and 2. Features of the interior of the coupling 20 will now be described, in connection with FIG. 3.

As shown, the exterior sleeve 70 of the release ring 42 has a countersink 92, which is oriented generally inward. The interior sleeve 76 also has a countersink 94, which is oriented generally outward. The countersinks 92, 94 are thus both oriented toward the corresponding surfaces of the shoulder 51 to facilitate assembly of the release ring 42 and the body 40.

An annular gap 95 exists between the exterior sleeve 70 and the shoulder 51. The annular gap 95 is dimensioned such that a clearance 96 exists between the exterior sleeve 70 and the shoulder 51. The clearance 96, when applied to both sides of the second end 50 (i.e., the top and bottom sides, with reference to the view of FIG. 3), results in the existence of an overall clearance of double the clearance 96. In order to prevent dirt entry into the annular gap 95, the clearance 96 may advantageously be less than about 0.02 inches. Furthermore, the clearance 96 may advantageously be less than about 0.01 inches, or even less than about 0.005 inches.

If desired, the clearance 96 may be the minimum clearance that still permits installation of the release ring 42 and the body 40. The clearance 96 may alternatively be the maximum clearance that generally keeps dirt from entering the annular gap 95 when the coupling 20 is buried. The tightness of the clearance 96 not only keeps dirt from the annular gap 95, but it also keeps dirt from entering the space inward of the annular wall 82. Thus, the clearance 96 helps to prevent dirt from increasing frictional resistance or direct physical interference with longitudinal motion of the release ring 42 toward the second end 50.

According to one embodiment, the diameter of the shoulder 51 and the inside diameter of the exterior sleeve 70 may have the same nominal value. When the release ring 42 and the body 40 are assembled, the exterior sleeve 70 may be stretched somewhat as the retention features 56 wedge apart opposite sides of the exterior sleeve 70 to slide into the retention slots 72 of the exterior sleeve 70. Thus, the inside diameter of the exterior sleeve 70 may enlarge somewhat to provide the clearance 96. The clearance 96 is then sufficient to permit the release ring 42 to slide with respect to the second end 50, but small enough to restrict dirt entry into the annular gap 95.

The clearance 96 extends for a length 98 of the second end 50 sufficient to avoid dirt entry, and more particularly, to keep dirt from passing through the annular gap 95 to interfere with sliding motion of the release ring 42. The length 98 may advantageously be over one-quarter inch. In alternative embodiments, the length 98 may be as small as one-eighth of an inch or three-sixteenths of an inch, or as great as one-half inch or three-eighths of an inch. The length 98 shown is when the release ring 42 is positioned to retain the end 24 of the conduit 22, which is the position in which the release ring 42 is normally disposed.

The coupling 20 has a retainer ring 100 in addition to the body 40 and the release ring 42. The retainer ring 100 has a lip 102 that extends outward (i.e., in the lateral and transverse directions 14, 16) adjacent to the edge of the shoulder 51. The retainer ring 100 also has a sleeve 104 extending generally within the second end 50. A countersink 106 is disposed at the juncture of the sleeve 104 with the lip 102 to facilitate assembly of the release ring 42 with the retainer ring 100.

As shown, the body 40 has a bore 108 that extends from the first end 44 to the second end 50. The bore 108 curves along with the bend 52 and, as it passes through the second end 50, shares the axis 84. The bore 108 has a retention portion 110 sized to receive the end 24 of the conduit 22. The retention portion 110 may be sized to press inward against the end 24 in such a manner that the retention portion 110 grips the end 24 to keep the conduit 22 in place. The bore 108 also has a flat step 112 at which the diameter of the bore 108 steps up from that of the retention portion 110. Furthermore, the bore 108 has a lipped step 114 at which the diameter of the bore 108 steps up from that of the region between the flat step 112 and the lipped step 114.

A seal ring 120 is seated against the flat step 112. The seal ring 120 is formed of a resilient material such as rubber. The seal ring 120 has a generally annular shape, with a countersink 122 facing inward and toward the release ring 42. A spring washer 130 is seated against the lipped step 114. The spring washer 130 has a plurality of fingers 132 that extend inward. The spring washer 130 also has a peripheral lip 134 that curls over the lipped step 114 so that the peripheral lip 134 is unable to contract excessively during deflection of the spring washer 130. The configuration of the spring washer 130 will be shown and described with greater clarity in connection with FIG. 4.

The coupling 20 may be fabricated in a variety of ways. According to one method, the body 40, the release ring 42, and the retainer ring 100 are all formed of plastic via injection molding. Blow molding, stamping, or other methods may alternatively be used. The seal ring 120 may be injection molded of an elastomer such as rubber, and the spring washer 130 may be stamped of a metal such as steel, stainless steel, or aluminum.

The seal ring 120 may first be inserted into the bore 108 of the body 40 along the longitudinal direction 12 and seated against the flat step 112 of the bore 108. The spring washer 130 may then be inserted into the bore 108 along the longitudinal direction 12 and seated against the lipped step 114 in such a manner that the peripheral lip 134 of the spring washer 130 engages the lipped step 114.

After the seal ring 120 and the spring washer 130 have been installed, the retainer ring 100 may be inserted into the bore 108 of the body 40 along the longitudinal direction 12 in such a manner that the sleeve 104 of the retainer ring 100 rests directly within the second end 50, as shown in FIG. 3. The sleeve 104 may then abut or be disposed directly adjacent to the peripheral lip 134 of the spring washer 130 so that the retainer ring 100 keeps the spring washer 130 in place. The spring washer 130, in turn, keeps the seal ring 120 in place.

When the retainer ring 100 has been disposed in the position illustrated in FIG. 3, the retainer ring 100 may be ultrasonically welded, thermally welded, adhesive bonded, or otherwise attached to the second end 50. If desired, an annular bead (not shown) may be formed on the lip 102 of the retainer ring 100 at a position such that the annular bead is sandwiched between the lip 102 and the second end 50 when the retainer ring 100 is installed. The annular bead may then fuse with the second end 50 during ultrasonic welding to secure the lip 102 to the second end 50.

When the retainer ring 100 has been secured, the release ring 42 may be inserted into engagement with the second end 50 along the longitudinal direction 12. The release ring 42 is inserted such that the interior sleeve 76 passes through the countersink 106 and into the sleeve 104 of the retainer ring 100. The countersinks 106, 94 cooperate to facilitate insertion and centering of the interior sleeve 76 of the release ring 42 within the sleeve 104 of the retainer ring 100. Simultaneously, the exterior sleeve 70 of the release ring 42 passes around the lip 102 of the retainer ring 100 and around a portion the shoulder 51, as shown in FIG. 3. The countersink 92 of the exterior sleeve 70 aids insertion and centering of the exterior sleeve 70 around the lip 102 and the second end 50.

As the sleeves 70, 76 engage the retainer ring 100 and the second end 50, the exterior sleeve 70 expands in the lateral direction 14 to pass around the retention feature 56, as described previously. The ramps 60 are positioned such that the release ring 42 is able to be inserted longitudinally over the second end 50 so that the ramps 60 cause the exterior sleeve 70 to expand in the lateral direction 14, thereby permitting continued motion of the release ring 42 in the longitudinal direction 12. The exterior sleeve 70 extends around the retention features 56 until the retention features 56 are captured within the retention slots 72 of the exterior sleeve 70. If desired, the exterior sleeve 70 may have interior grooves (not shown) extending from the retention slots 72 to the countersink 92 to facilitate passage of the exterior sleeve 70 over the retention features 56.

Once the retention slots 72 have moved far enough to capture the retention features 56, the coupling 20 is fully assembled and ready for use. The spring washer 130 exerts pressure on the countersink 94 of the interior sleeve 76 of the release ring 42 to urge the release ring 42 to remain positioned as in FIG. 3, so that the coupling 20 remains in the engaged configuration. The engagement of the retention features 56 with the retention slots 72 keeps the release ring 42 from moving further from the body 40 and the retainer ring 100.

The end 24 of the conduit 22 may be easily engaged within the coupling 20. More precisely, the end 24 may be inserted into the bore 78 of the interior sleeve 76 along the longitudinal direction 12. The end 24 may be pushed deeper into the coupling 20 so that the end 24 passes through the spring washer 130, thereby causing the fingers 132 of the spring washer 130 to deflect outward (i.e., in the lateral and transverse directions 14, 16), and toward the retention portion 110 of the bore 108 of the body 40. The end 24 then passes through the seal ring 120 and may optionally be pushed into the retention portion 110 until the outer wall of the end 24 abuts the retention portion 110.

Alignment of the end 24 with the seal ring 120 during insertion is facilitated by the countersink 122 of the seal ring 120. The seal ring 120 presses against the end 24 to form a substantially fluid-tight seal (i.e., a watertight seal in the context of an irrigation system). The seal keeps fluid from leaking out of the coupling 20 through the second end 50 at pressure differentials up to the maximum operating pressure of the fluid system 10. Accordingly, fluid loss can be avoided without complicating the process of attaching the end 24 to the coupling 20.

When the end 24 is disposed within the retention portion 110, the spring washer 130 is deflected in such a manner that, if the conduit 22 is drawn longitudinally outward, the fingers 132 seat themselves in the conduit 22 to prevent withdrawal of the end 24 from the coupling 20. Hence, the end 24 cannot be withdrawn from within the coupling 20 without moving the coupling 20 to the disengaged configuration, which will be shown and described subsequently, in connection with FIG. 4.

Figure 4:
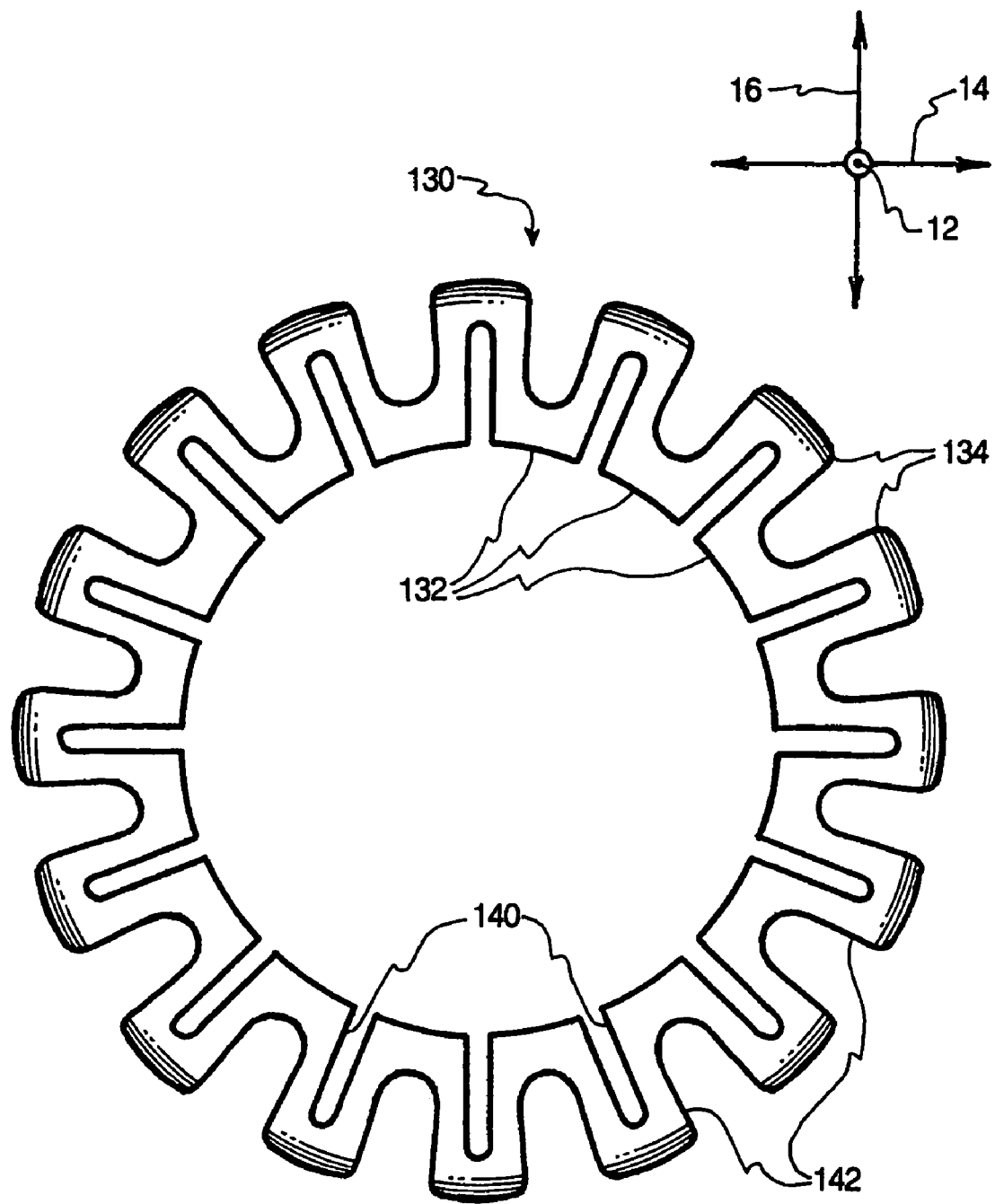
FIG. 4 is a front elevation view of the spring washer of the coupling of FIG. 1.

Referring to FIG. 4, a front elevation view illustrates the spring washer 130 in isolation, in substantially undeflected form. As shown, the fingers 132 extend inward from the peripheral lip 134. The peripheral lip 134 extends in the longitudinal direction 12, i.e., toward the retention portion 110 of the bore 108 of the body 40 (shown in FIG. 3). In this application, "finger" does not denote any specific shape or length-to-width ratio. Rather, a "finger" is simply an extension. In alternative embodiments, a spring washer may have fewer fingers, each of which extends around a substantial portion of the diameter of the end 24. For example, only two fingers, each of which has a near-semicircular profile, may be disposed on either side of such a spring washer to retain the end 24.

Returning to the embodiment of FIG. 4, the spring washer 130 has a plurality of interior slots 140 that separate the fingers 132 from each other. The interior slots 140 are arrayed in generally radial fashion. The spring washer 130 also has a plurality of exterior slots 142 that facilitate flexing of the fingers 132 in the longitudinal direction 12 and enable the peripheral lip 134 to maintain its size and engagement with the lipped step 114 during flexing of the fingers 132.

Figure 5:
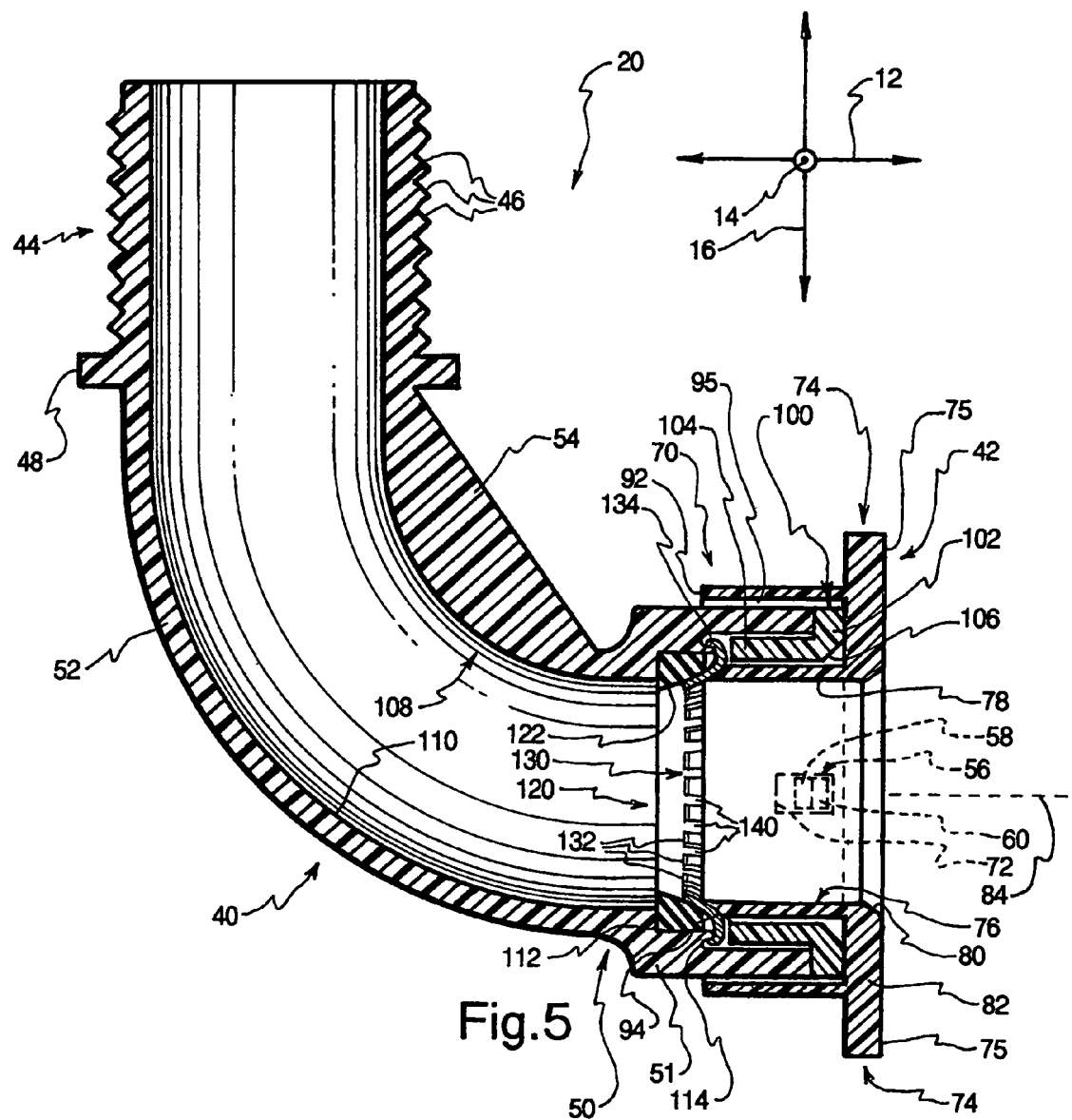
FIG. 5 is a side elevation, section view of the coupling of FIG. 1, in the disengaged configuration to release the end of the conduit.

Referring to FIG. 5, a side elevation, section view illustrates the coupling 20 in the disengaged configuration. The release ring 42 is simply actuated longitudinally toward the retainer ring 100 by, for example, holding the body 40 and pressing the release grips 74 of the release ring 42 toward the body 40. The interior sleeve 76 of the release ring 42 moves further into the bore 108 and the countersink 94 of the interior sleeve 76 presses against the spring washer 130.

The release ring 42 may move longitudinally until the annular wall 82 of the release ring 42 abuts the lip 102 of the retainer ring 100. At this point, the retention slots 72 have moved such that the retention features 56 are disposed at the opposite end of the retention slots 72 from their position in the engaged configuration.

In response to pressure from the countersink 94 of the interior sleeve 76, the fingers 132 deflect toward the retention portion 110 of the bore 108, as illustrated in FIG. 5. The fingers 132 simultaneously bend outward to define a diameter larger than the outside diameter of the conduit 22. Thus, the fingers 132 no longer seat in the conduit 22, and the end 24 of the conduit 22 can be freely withdrawn along the longitudinal direction 12 from the bore 108.

The release ring 42 may then be released to permit the coupling 20 to return to the disengaged configuration. Then, the conduit 22 or a different conduit may then be coupled or re-coupled via insertion into the bore 108, as described previously.

According to alternative embodiments of the invention, a body of a coupling may have a wide variety of shapes aside from a ninety degree bend. A wide variety of end types may also be used, depending on the manner in which the coupling is to be used.

In one exemplary alternative embodiment, a coupling (not shown) may have a straight body. Instead of a threaded end, the coupling may have a body with two ends like the second end 50 of the coupling 20. The coupling may also have two corresponding release rings 42, seal rings 120, and spring washers 130, so that the coupling is able to releasably receive an end 24 of a conduit 22 in each end of the body. Such a coupling thus permits two conduits to be joined end-to-end to effectively provide one longer conduit. Some additional exemplary shapes and coupling end types will be shown and described in connection with the remaining Figures.

Figure 6:
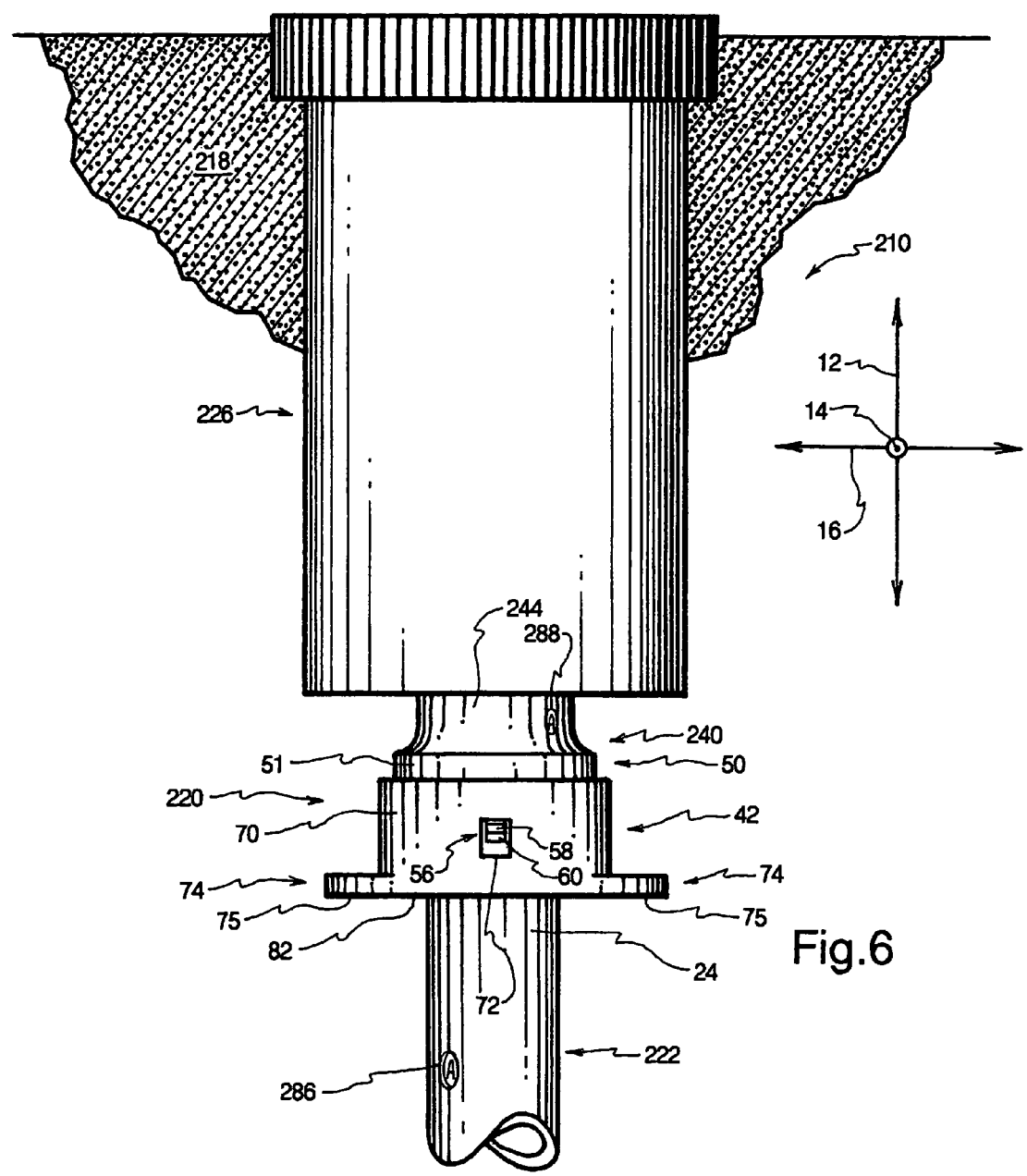
FIG. 6 is a side elevation view of a portion of a fluid system according to an alternative embodiment of the invention, in which a component is integrally formed with a coupling.

Referring to FIG. 6, a side elevation view illustrates a portion of a fluid system 210 according to one alternative embodiment of the invention. As in the previous embodiment, the fluid system 210 may be an irrigation system designed to distribute water to soil. The fluid system 210 is at least partially buried within soil 218, which is to receive water from the fluid system 210. As shown, the fluid system 210 includes a coupling 220, a conduit 222 having an end 24 designed to be retained by the coupling 220, and a component 226. As shown, the component 226 is an irrigation component, or more specifically, a pop-up sprinkler head designed to irrigate the soil 218.

The coupling 220 has a body 240 and a retention mechanism, which may comprise a release ring 42. The body 240 also has a first end 244 connected to the component 226 and a second end 50 that receives the end 24 of the conduit 222. The body 240 is substantially straight, and extends along the transverse direction 16.

As in the previous embodiment, the second end 50 comprises a shoulder 51 with a generally cylindrical shape. The second end 50 has retention features 56, each of which includes a plateau 58 and a ramp 60. The release ring 42 has an exterior sleeve 70 with retention slots 72 that interlock with the retention features 56 in a manner similar to those of the previous embodiment. The release ring 42 also has release grips 74 that extend outward from the exterior sleeve 70.

Each of the release grips 74 has a contact surface 75 against which a user can easily exert pressure to cause the release ring 42 to move in the transverse direction 16. The release grips 74 extend generally coplanar with an annular wall 82 of the release ring 42. The coupling 220 includes a seal ring 120 (not shown) and a gripping mechanism such as the spring washer 130 (not shown) disclosed previously. The release ring 42, the seal ring 120, and the spring washer 130 interact in a manner similar to that of the previous embodiment to provide releasable, substantially water-tight retention of the end 24 of the conduit 222.

The first end 244 of the body 240 is integrally formed with the component 226. According to one example, the component 226 may have a housing that is molded as a single piece with the body 240 of the coupling 220. Thus, no fittings are required to connect the component 226 to the coupling 220.

As illustrated, the conduit 222 has an indicator 286 that indicates the size of the conduit 222. The indicator 286 comprises a symbol, which may optionally include one or more letters or numbers. The body 240 of the coupling 220 also has an indicator 288 that indicates the size of coupling that can be received by the coupling 220. The indicator 288 comprises a symbol that matches that of the indicator 286. The indicators 286, 288 are presented as alternatives to the use of colors to identify size. Hence, colors or other indicator types could be used in place of the indicators 286, 288, which are merely exemplary. The indicator 288 may additionally or alternatively be disposed on the release ring 42.

The conduit 222 may be attached to the coupling 220 in the manner described above, in connection with the previous embodiment. The end 24 of the conduit 222 may simply be inserted into the second end 50 of the body 240 until gripping occurs. Likewise, the end 24 of the conduit 222 may be removed from the coupling 220 by pressing the retaining ring 42 in the transverse direction 16 (e.g., upward in FIG. 6) to induce the spring washer 130 to release the end 24. The end 24 may then be withdrawn. The component 226 is integrally formed with the first end 244 of the body 240; hence, the component 226 need not be connected to the coupling 220 and cannot be removed therefrom.

Figure 7:
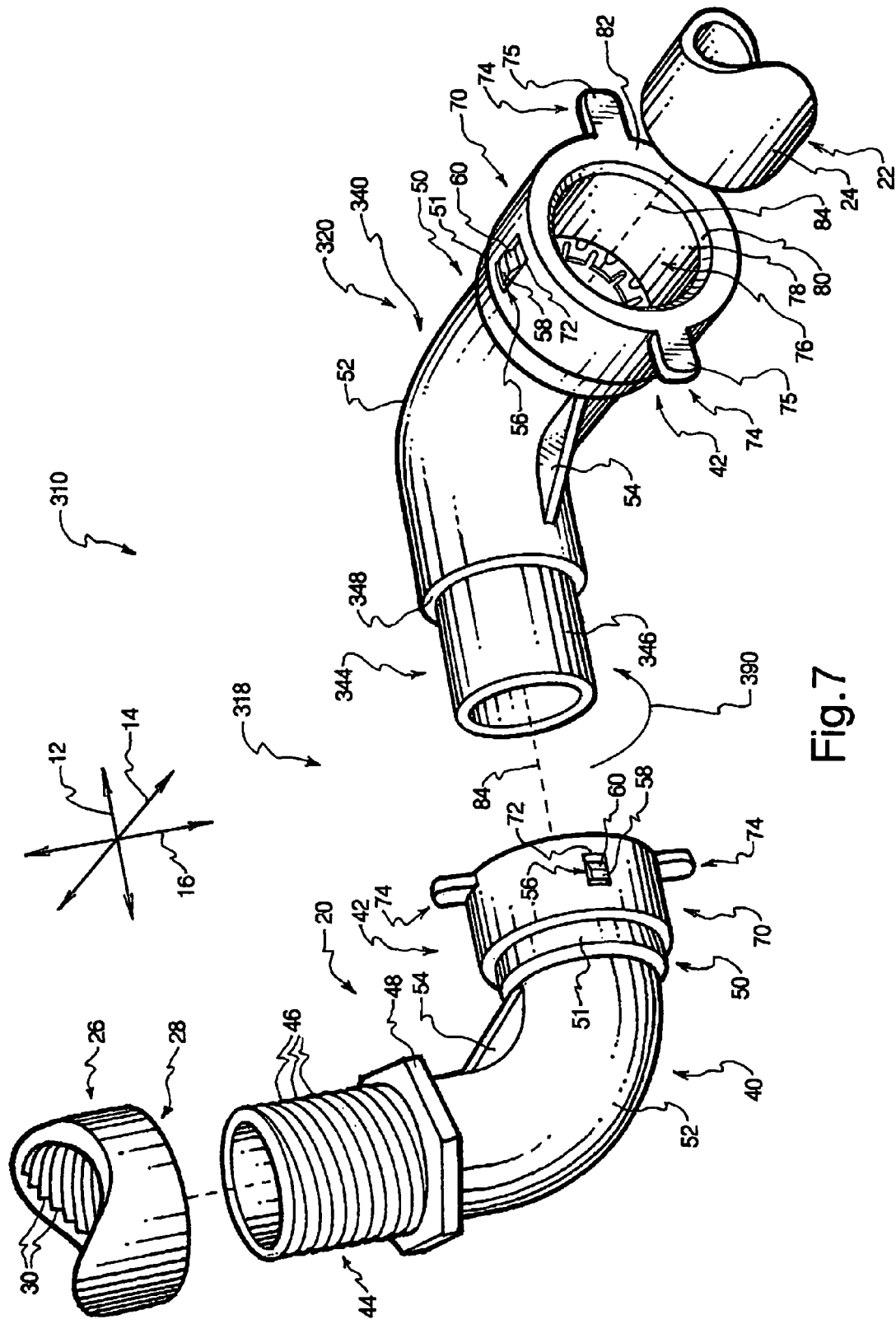
FIG. 7 is an exploded, perspective view of a portion of a fluid system according to another alternative embodiment, in which a component is connected to a conduit via a swing joint comprising a coupling connected to a swing coupling.

Referring to FIG. 7, an exploded, perspective view illustrates a portion of a fluid system 310 according to another alternative embodiment of the invention. The fluid system 310 may comprise a fluid system 310. As shown, the fluid system 310 includes a swing joint 318 that connects a component 26 like that of FIG. 1 to a conduit 22 at any of a plurality of angles. The swing joint 318 can be manipulated to dispose the first end 44 of the coupling 20, and thus, the threaded end 28 of the component 26, parallel to the end 24 of the conduit 222, perpendicular to the end 24, or at substantially any angle therebetween. Thus, the swing joint 318 can act as a U-shaped fitting, an L-shaped fitting, an S-shaped fitting, or a fitting having some other angle.

The swing joint 318 has a coupling 20 identical to that of the first embodiment (i.e., the embodiment of FIGS. 1-5) and a swing coupling 320 designed to connect to the coupling 20. The swing coupling 320 is similar to the coupling 20, with some differences. The swing coupling 320 has a body 340 and a release ring 42 that slides with respect to the body 340 to enable the swing coupling 320 to release the conduit 22.

The body 340 has a first end 344 that includes a tube 346 extending in the longitudinal direction 12, and an annular shoulder 348 where the outside diameter of the first end 344 steps up. The tube 346 has an outside diameter similar to that of the conduit 22 so that the tube 346 can be inserted into and retained by the coupling 20 in watertight fashion. The annular shoulder 348 then abuts the release ring 42 of the coupling 20.

The body 340 of the swing coupling 320 also has a second end 50 like that of the coupling 20. The second end 50 cooperates with the release ring 42 to provide releasable retention of the conduit 22 in the manner described above, in connection with the coupling 20 of FIGS. 1-5. The first and second ends 344, 50 of the body 340 are separated by a bend 52 like that of the coupling 20. The bend 52 may thus comprise a ninety degree angle. More precisely, the second end 50 has retention features 56 that interlock with retention slots 72 formed in an exterior sleeve of the release ring 42.

The second end 50 has an axis 84 along which the end 24 of the conduit 22 is insertable into the second end 50. As shown, the axis 84 extends along the lateral direction 14. The first end 44 of the coupling 20 is oriented generally parallel to the transverse direction 16. Hence, if coupled together as shown, the swing joint 318 will dispose the threaded end 28 of the component 26 and the end 24 of the coupling 22 generally perpendicular to each other.

The swing coupling 320 may be rotated about the longitudinal direction 12, as indicated by the arrow 390, to any desired orientation and the tube 346 of the first end 344 may still be inserted into and retained by the second end 50 of the coupling 20. Hence, the end 24 of the conduit 22 may be disposed in a variety of orientations with respect to the first end 44 of the coupling 20, as mentioned previously. Thus, the swing joint 318 may be used to enable the end 24 of the conduit 22 to connect to the component 26 at the angle at which it most naturally lies. Thus, stress on the conduit 22 may be reduced to avoid pull-out, kinking, and the like.

The operation of the spring washer 130 within the second end 50 of the coupling 20 may or may not permit rotation of the swing coupling 320 with respect to the coupling 20 while the tube 346 is engaged by the spring washer 130. The tube 346 of the swing coupling 320 may, in any case, be withdrawn from the second end 50 of the coupling 20 via actuation of the release ring 42 and reinserted at a different orientation to adjust the angle at which the first end 44 of the coupling 20 is disposed with respect to the end 24 of the conduit 22.

Tubes like the tube 346 of the first end 344 of the body 340 of the swing coupling 320 may also be attached to or integrally formed with a component to facilitate releasable attachment of the component to a coupling according to the invention, such as the coupling 20. Such attachment may be performed in a manner similar to that of the coupling 20 and the swing coupling 320 of FIG. 7. The tube may simply be inserted into the second end 50 of the body 40 of such a coupling 20, in the same manner in which the end 24 of the conduit 22 may be inserted and retained.

If desired, a straight coupling according to the invention may even be elongated to provide a conduit. Such a coupling (not shown) may have an elongated, generally straight body with a first end like the end 24 of the conduit 22, and a second end like the second end 50 of the body 40 of the coupling 20. A release ring 42, seal ring 120, and spring washer 130 may also be connected to the second end to provide releasable retention. Multiple such couplings may then be attached end-to-end by inserting the end 24 of the body of one coupling into the second end 50 of the body 40 of an adjacent coupling. Thus, the conduits/couplings may be attached end-to-end without using any attachment mechanism aside from those provided by the conduits themselves.

Figure 8:
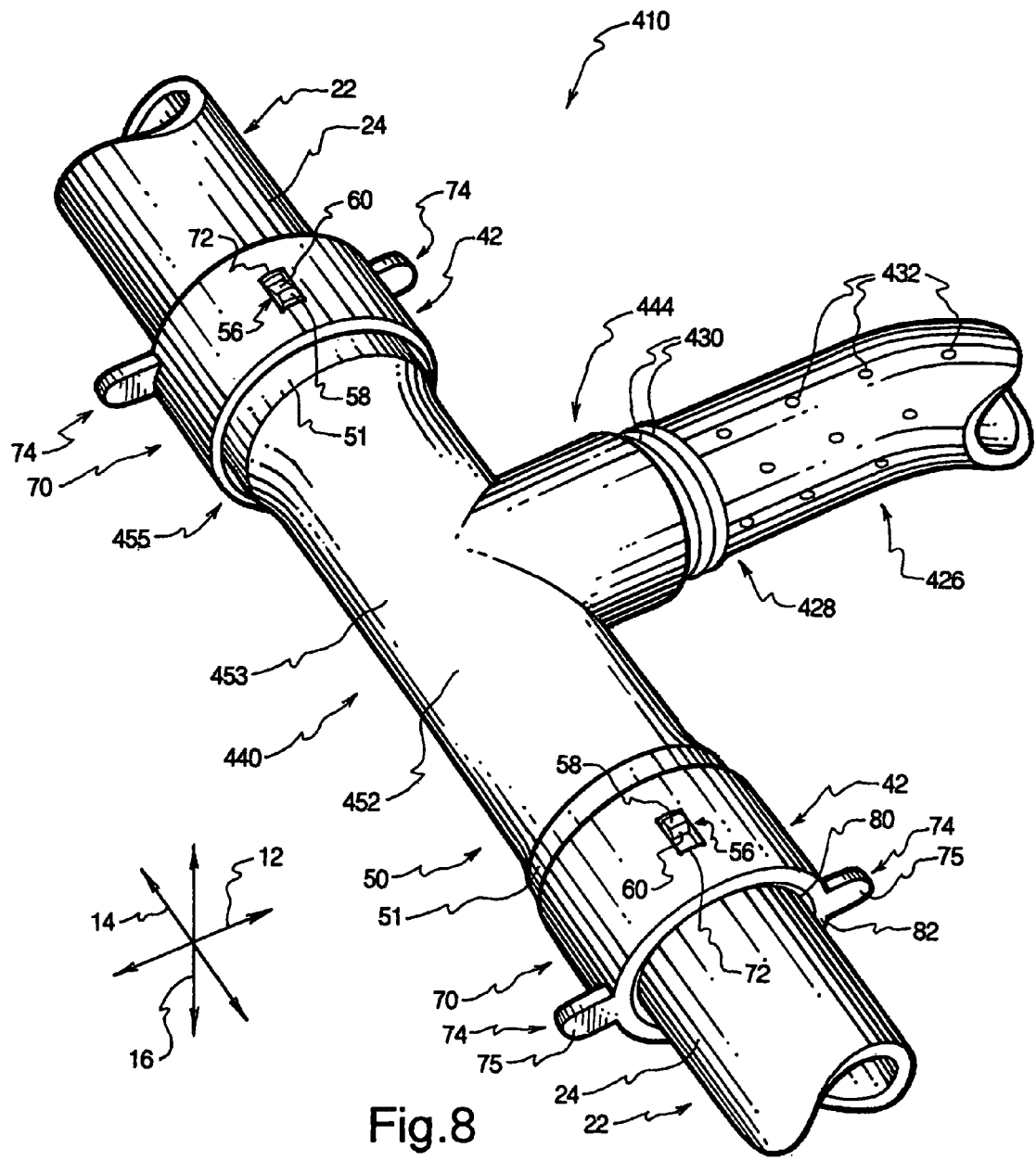
FIG. 8 is a perspective view of a portion of a fluid system according to another alternative embodiment of the invention, in which a component is connected to two conduits via a T-shaped coupling having three ends.

Referring to FIG. 8, a perspective view illustrates a portion of a fluid system 410 according to another alternative embodiment of the invention. The fluid system 410 may comprise an irrigation system for distributing water to soil. As shown, the fluid system 410 includes a coupling 420 that connects two conduits 22 and a component 426 together. The component 426 comprises a drip irrigation conduit with a threaded end 428 comprising threads 430 disposed on the outside diameter thereof to form a male threaded fitting. The component 426 also has a plurality of holes 432 distributed along its length to distribute water underground, thereby providing drip irrigation.

As shown, the coupling 420 has a body 440 and two release rings 42, which may be identical to those of the previous embodiments. The body 440 has a first end 444 including threads (not shown) disposed on an inside diameter thereof to provide a female threaded fitting to interlock with the threaded end 428 of the component 426. The body 440 also has a second end 50 having a shoulder 51 and retention features 56 that interlock with one of the release rings 42. The corresponding release ring 42 cooperates with a seal ring (not shown) and a spring washer (not shown) like the seal ring 120 and the spring washer 130 of the previous embodiments to releasably retain an end 24 of one of the conduits 22 in a fluid-tight manner.

The body 440 also has a bend 452 that separates the first and second ends 444, 50. The bend 452 provides a ninety-degree angle between the first and second ends 444, 50. Additionally, the body 440 includes a branch 453 that extends from the bend 452 to a third end 455. The third end 455 may be substantially identical to the second end 50, and may be connected to the other retaining ring 42. The other retaining ring 42 cooperates with another seal ring (not shown) and another spring washer (not shown) to releasably retain an end 24 of the other conduit 22 in a fluid-tight manner.

As shown, the branch 453 extends from the bend 452 at such an angle that the body 440 has a T-shape. In alternative embodiments, a bend need not have a ninety degree angle, and a branch may extend therefrom at a variety of angles. The corresponding body may then have a variety of shapes, including a Y-shape, a trident, and the like. In the configuration shown, the coupling 420 may be particularly useful for components connected in series, such as sprinkler heads or drip irrigation tubes connected to a single line formed by the conduits 22.

In one alternative configuration, a third release ring 42 may be provided in place of the threaded interface of the first end 444. Thus, three conduits 22 may be joined together in a T-configuration. Such a configuration may also be particularly useful for connecting components in series, with a length of conduit 22 disposed between each component and each coupling.

Figure 9:
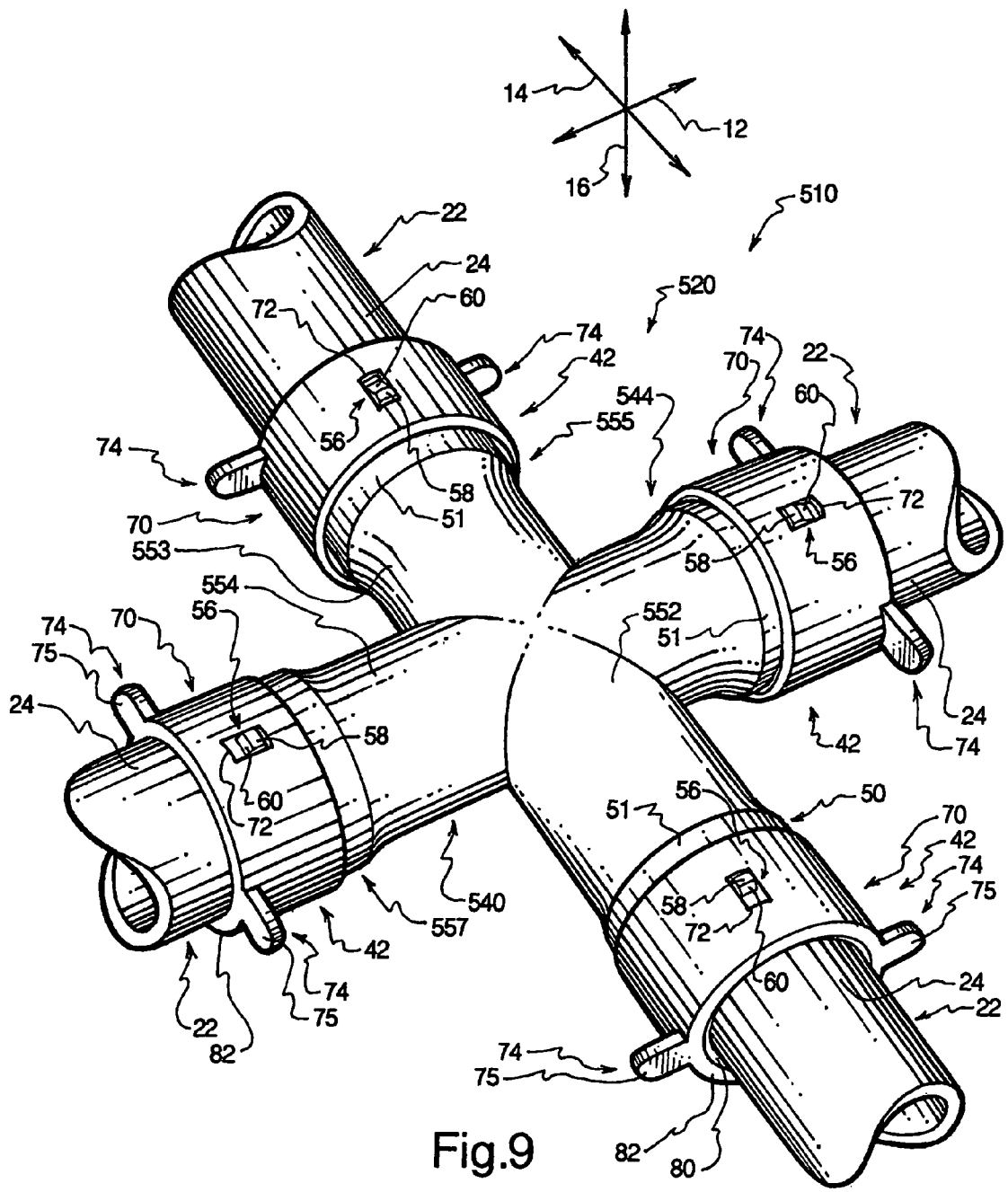
FIG. 9 is a perspective view of a portion of a fluid system according to yet another alternative embodiment of the invention, in which four conduits are connected together via an X-shaped coupling having four ends.

Referring to FIG. 9, a perspective view illustrates a fluid system 510 according to yet another embodiment of the invention. The fluid system 510 may comprise an irrigation system for distributing water to soil. The fluid system 510 includes a coupling 520 and four conduits 22 like those of previous embodiments. Since the term "component" includes conduits, each of the conduits 22 may be referred to as a component of the fluid system 510. The coupling 520 serves to connect all four of the conduits 22 together.

The coupling 520 includes a body 540 and four release rings 42 like the release rings 42 described previously. The body 540 has a first end 544 comprising a shoulder 51 and retention features 56 that cooperate with a corresponding release ring 42 to slidably retain the release ring 42. The release ring 42 cooperates with a seal ring (not shown) and a gripping mechanism (not shown), like the seal ring 120 and the spring washer 130 of the first embodiment, to releasably retain the end 24 of one of the conduits 22.

The body 540 also has a second end 50 substantially identical to the first end 544. The second end 50 thus also slidably receives an associated release ring 42, which cooperates with another seal ring and another gripping mechanism to releasably retain the end 24 of another of the conduits 22. The first and second ends 544, 50 of the body 540 are separated from each other by a bend 552 with a ninety degree angle.

Additionally, the body 540 includes a first branch 553 and a second branch 554, each of which extends from the bend 552. The first branch 553 extends to a third end 555 disposed opposite the second end 50, and the second branch 554 extends to a fourth end 557 disposed opposite the first end 544. Each of the third and fourth ends 555, 557 is substantially identical to the first and second ends 544, 50. Hence, each of the third and fourth ends 555, 557 slidably receives one of the release rings 42. The release rings 42 cooperate with corresponding seal rings (not shown) and gripping mechanisms (not shown) to retain the ends 24 of the remaining two conduits 22.

The bend 552 has a ninety degree angle, and the first and second branches 553, 554 are offset by ninety degree angles such that the body 540 of the coupling 520 is generally X-shaped. Many other shapes could alternatively be used to angle the ends 24 of the conduits 22 in any combination of directions. Indeed, a coupling according to the present invention may even connect to three or more conduits and/or components with axes that are not coplanar to each other.

In one alternative embodiment of the invention, a coupling (not shown) may be shaped to provide a manifold for irrigation valves or the like. The coupling may then have an inlet end through which fluid is received from a main line, and a plurality of outlet ends extending in directions opposite to that of the first end to connect to valves oriented generally parallel to each other. The coupling may thus have a trident shape or the like. However, more or fewer than three outlet ends may be present, and they need not be symmetrically arranged with respect to the inlet end.

The inlet end and each of the outlet ends may have a release ring 42 so that conduits such as the conduits 22 described previously can be connected between the coupling and the main line and valves. Alternatively, the inlet and/or outlet ends may have integrally formed tubes like the tube 346 of the first end 344 of the body 340 of the swing coupling 320. Thus, the inlet and/or outlet ends can be releasably inserted into couplings such as the coupling 20 or the coupling 220, which are connected to the main line and/or the valves.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A coupling for conveying fluid between a conduit and a component of a fluid system, the coupling comprising:
    a body comprising a bore into which a tube end of the conduit is insertable, wherein the tube end has a smooth outer surface without annular grooves, annular flanges, or annular beads;
    a gripping mechanism that grips the smooth outer surface of the tube end of the conduit, to fix a position of the tube end of the conduit within the bore; and
    a release mechanism slidably attached to the body to induce the gripping mechanism to release the tube end of the conduit, the release mechanism comprising a continuous, undivided unitary release ring with an axial through bore and at least one radially-through retention slot, said release ring encircling the body, said release ring to facilitate gripping and manual actuation of the release mechanism; and the body further comprising a retention feature protruding radially outward to establish a limited range of motion for the release mechanism.

2. The coupling of claim 1, wherein the gripping mechanism comprises a spring washer seated in the bore, the spring washer comprising a plurality of fingers that flex outward to receive the tube end of the conduit and extend inward to seat against the tube end of the conduit in response to pressure tending to withdraw the tube end of the conduit from the bore, wherein the release ring comprises an interior sleeve extending into the bore to induce outward flexure of the fingers to release the tube end of the conduit in response to sliding of the release ring.

3. The coupling of claim 2, wherein the release ring further comprises an exterior sleeve sized to encircle a second end of the body with a clearance sufficiently small to restrict interference with motion of the release mechanism from dirt in contact with the coupling.

4. The coupling of claim 2, wherein the release mechanism comprises an exterior sleeve disposed to encircle a second end of the body to define an annular gap between the second end and the exterior sleeve, the retention feature further comprising a first retention feature protruding into the annular gap to establish a limited range of motion for the release mechanism.

5. The coupling of claim 2, wherein the release mechanism comprises an exterior sleeve disposed to encircle a second end of the body, release grips, and an annular wall that extends between the interior and exterior sleeves, wherein the annular wall abuts the second end to limit motion of the release ring with respect to the body, wherein the release grips extend outward from an axis of the bore.

6. The coupling of claim 1, further comprising release grips having a contact surface sized to receive pressure from a digit of a user to permit actuation of the release mechanism via pressure applied by hand against the release grips.

7. A coupling for conveying fluid between a conduit and a component of a fluid system, the coupling comprising:
    a body comprising a first end and a second end, the second end comprising a bore into which a tube end of the conduit is insertable, wherein the tube end has a smooth outer surface without annular grooves, annular flanges, or annular beads;
    a gripping mechanism that grips the smooth outer surface of the tube end of the conduit to fix a position of the tube end of the conduit within the bore; and
    a release mechanism slidably attached to the body to induce the gripping mechanism to release the tube end of the conduit, the release mechanism comprising an exterior sleeve sized to encircle the second end with a clearance sufficiently small to restrict interference with motion of the release mechanism from dirt in contact with the coupling the release mechanism comprising a continuous, undivided unitary release ring with a axial through bore and at least one radially-through retention slot, said release ring encircling the body, said release ring to facilitate gripping and manual actuation of the release mechanism; and
    the body further comprising a retention feature protruding radially outward to establish a limited range of motion for the release mechanism.

8. The coupling of claim 7, wherein the gripping mechanism comprises a spring washer seated in the bore, the spring washer comprising a plurality of fingers that flex outward to receive the tube end of the conduit and extend inward to seat against the conduit in response to pressure tending to withdraw the tube end of the conduit from the bore, wherein the release ring further comprising an interior sleeve extending into the bore to induce outward flexure of the fingers to release the tube end of the conduit in response to sliding of the release ring.

9. The coupling of claim 8, wherein the release mechanism comprises an annular wall that extends between the interior and exterior sleeves, wherein the annular wall abuts the second end to limit motion of the release ring with respect to the body, wherein the clearance is small enough to substantially prevent dirt entry between the annular wall and the second end.

10. The coupling of claim 8, wherein the exterior sleeve defines an annular gap between the second end and the exterior sleeve, the retention feature further comprising a first retention feature protruding into the annular gap to establish a limited range of motion for the release mechanism.

11. The coupling of claim 7, wherein the clearance is less than about 0.02 inches.

12. The coupling of claim 11, wherein the exterior sleeve comprises an inside diameter that is nominally equal to an outside diameter of the second end, wherein the exterior sleeve is deformable to provide the clearance in response to assembly of the release mechanism with the second end.

13. The coupling of claim 7, wherein the clearance extends along a length of the second end of at least 0.25 inches.

14. A coupling for conveying fluid between a conduit and a component of a fluid system, the coupling comprising:
   a body comprising a first end and a second end, the second end comprising a bore into which a tube end of the conduit is insertable, wherein the tube end has a smooth outer surface without annular grooves, annular flanges, or annular beads;
   a gripping mechanism that grips the smooth outer surface of the tube end of the conduit to fix a position of the tube end of the conduit within the bore; and
   a release mechanism slidably attached to the body to induce the gripping mechanism to release the tube end of the conduit, the release mechanism comprising an exterior sleeve disposed to encircle the second end to define an annular gap between the second end and the exterior sleeve, the body comprising a first retention feature protruding into the annular gap to establish a limited range of motion for the release mechanism, the release mechanism comprising a continuous, undivided unitary release ring with a axial through bore and at least one radially-through retention slot, said release ring encircling the body, said release ring to facilitate gripping and manual actuation of the release mechanism.

15. The coupling of claim 14, wherein the release mechanism comprises an annular wall that extends between the interior and exterior sleeves, wherein the annular wall abuts the second end to limit motion of the release ring with respect to the body, wherein the clearance is small enough to substantially prevent dirt entry between the annular wall and the second end.

16. The coupling of claim 14, wherein the body further comprise a second retention feature protruding into the annular gap on an opposite side of the second end from the first retention feature such that the second retention feature cooperates with the first retention feature to establish the limited range of motion for the release mechanism.

17. The coupling of claim 14, wherein the first retention feature is movable to establish the limited range of motion for the release mechanism via abutment of the first retention feature with an end of one of said at least one retention slot.

18. The coupling of claim 17, wherein the first retention feature is fixed with respect to the second end and the one of said at least one slot is formed in the exterior sleeve.

19. The coupling of claim 18, wherein the first retention feature comprises a ramp disposed to facilitate assembly of the release mechanism with the second end by inducing deformation of the exterior sleeve in response to pressure urging the release mechanism toward the second end, wherein the first retention feature further comprises a plateau adjoining the ramp to resist disassembly of the release mechanism from the second end via abutment of the plateau against the end of said one of at least one retention slot.

20. A coupling for conveying fluid between a conduit and a component of a fluid system, the coupling comprising:
   a body comprising a first end and a second end, the second end comprising a bore into which a tube end of the conduit is insertable, wherein the tube end has a smooth outer surface without annular grooves, annular flanges, or annular beads, the body further comprising a bend disposed to alter a flow orientation of fluid flowing between the first and second ends;
   a gripping mechanism that grips the smooth outer surface of the tube end of the conduit to fix a position of the tube end of the conduit within the bore; and
   a release mechanism slidably to the body to induce the gripping mechanism to release the tube end of the conduit the release mechanism comprising a continuous, undivided unitary release ring with a axial through bore and at least one radially-through retention slot, said release ring encircling the body, said release ring to facilitate gripping and manual actuation of the release mechanism; and
   the body further comprising a retention feature protruding radially outward to establish a limited range of motion for the release mechanism.

21. The coupling of claim 20, wherein the first end of the body is insertable into a bore of a body of a second coupling along a plurality of orientations such that the coupling and the second coupling, together, form a swing joint.

22. The coupling of claim 20, wherein the bend comprises an angle of ninety degrees.

23. The coupling of claim 20, wherein the body further comprises a first branch that terminates in a third end in fluid communication with the first and second ends through the body.

24. The coupling of claim 23, wherein the first branch extends from the bend such that the coupling has a T-shape.

25. The coupling of claim 23, wherein the body further comprises a second branch, wherein the first and second branches extend from the bend such that the coupling has an X-shape.

26. The coupling of claim 20, wherein the coupling is part of an irrigation system for distributing water to soil, wherein the first end of the body is integrally formed with an irrigation component of the irrigation system.

27. The coupling of claim 20, wherein the first end comprises a second bore into which a tube end of a second conduit is insertable, the coupling further comprising:
   a second gripping mechanism that grips the end of the second conduit to fix a position of the end of the second conduit within the second bore; and
   a second release mechanism slidable with respect to the body to induce the second gripping mechanism to release the tube end of the second conduit.

28. A coupling for conveying fluid between a conduit and a component of a fluid system, the coupling comprising:
   a body comprising a bore into which a tube end of the conduit is insertable, wherein the tube end has a smooth outer surface without annular grooves, annular flanges, or annular beads, the conduit comprising a size selected to permit watertight engagement of the body and the tube end of the conduit;
   a gripping mechanism that grips the smooth outer surface of the tube end of the conduit to fix a position of the tube end of the conduit within the bore; and
   a release mechanism slidably attached to the body to induce the gripping mechanism to release the tube end of the conduit;
   wherein at least one of the group consisting of the body and the release mechanism comprises an indicator that indicates that the coupling is dimensioned to receive the conduit, the release mechanism comprising a continuous, undivided unitary release ring with a axial through bore and at least one radially-through retention slot, said release ring encircling the body, said release ring to facilitate gripping and manual actuation of the release mechanism; and the body further comprising a retention feature protruding radially outward to establish a limited range of motion for the release mechanism.

29. The coupling of claim 28, wherein the indicator indicates the size of the conduit, wherein the size is an outside diameter of the conduit that is receivable within the bore to provide the watertight engagement and to permit the gripping mechanism to securely grip the tube end of the conduit.

30. The coupling of claim 28, wherein the indicator comprises a color of at least part of the body.

31. The coupling of claim 30, wherein the color is substantially the same as a color of at least part of the conduit.

32. The coupling of claim 30, wherein the color is blue.

33. The coupling of claim 30, wherein the color is provided by molding at least one of the group consisting of the body and the release mechanism of plastic having the color.

* * * * *

UNITED STATES PATENT AND TRADEMARK OFFICE
CERTIFICATE OF CORRECTION

PATENT NO.        : 7,445,247 B2                                        Page 1 of 1
APPLICATION NO.   : 11/124217
DATED             : November 4, 2008
INVENTOR(S)       : Kent C. Ericksen et al.

It is certified that error appears in the above-identified patent and that said Letters Patent is hereby corrected as shown below:

In column 5, line 46, please replace "DETALED DESCRIPTION OF THE INVENTION" with --DETAILED DESCRIPTION OF THE INVENTION--

Column 17, in claim 1, line 8, please replace "the conduit, to fix" with --the conduit to fix--

Column 17, in claim 1, line 17, please replace "release mechanism; and the body" with --release mechanism; and
the body--

Column 20, in claim 20, line 13, please replace "mechanism slidably to the body" with --mechanism slidably attached to the body--

Column 20, in claim 20, line 14, please replace "conduit the release mechanism" with --conduit, the release mechanism--

Signed and Sealed this

Twenty-first Day of July, 2009

JOHN DOLL
*Acting Director of the United States Patent and Trademark Office*